United States Patent
Khoryaev et al.

(10) Patent No.: US 10,779,319 B2
(45) Date of Patent: *Sep. 15, 2020

(54) REDUCTION OF CONCURRENT SIGNALING IN A RELAY USER EQUIPMENT (UE)

(71) Applicant: APPLE INC., Cupertino, CA (US)

(72) Inventors: Alexey Khoryaev, Nizhny Novgorod (RU); Sergey Panteleev, Nizhny Novgorod (RU); Mikhail Shilov, Nizhny Novgorod (RU); Sergey Sosnin, Zavolzhie (RU); Pingping Zong, Randolph, NJ (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,256

(22) Filed: Jun. 21, 2019

(65) Prior Publication Data

US 2020/0084792 A1 Mar. 12, 2020

Related U.S. Application Data

(63) Continuation of application No. 15/566,643, filed as application No. PCT/US2015/066152 on Dec. 16, 2015, now Pat. No. 10,375,722.

(60) Provisional application No. 62/161,590, filed on May 14, 2015.

(51) Int. Cl.
| | |
|---|---|
| *H04W 72/12* | (2009.01) |
| *H04W 76/14* | (2018.01) |
| *H04W 76/15* | (2018.01) |
| *H04W 76/23* | (2018.01) |
| *H04W 74/04* | (2009.01) |

(52) U.S. Cl.
CPC ....... *H04W 72/1289* (2013.01); *H04W 74/04* (2013.01); *H04W 76/14* (2018.02); *H04W 76/15* (2018.02); *H04W 76/23* (2018.02)

(58) Field of Classification Search
CPC . H04W 72/1289; H04W 74/04; H04W 76/23; H04W 76/15; H04W 76/14
See application file for complete search history.

(56) References Cited

U.S. PATENT DOCUMENTS

2016/0295494 A1  10/2016  Gulati et al.

OTHER PUBLICATIONS

3GPP TSG RAN WG1 Meeting #80bis (R1-151442); Discussion on UE-to-NW Relay Implementation Aspects; Agenda item: 7.2.3.2.1; Belgrade, Serbia; Apr. 20-24, 2015.

(Continued)

*Primary Examiner* — Thai Nguyen

(74) *Attorney, Agent, or Firm* — Stoel Rives LLP

(57) ABSTRACT

Technology for an eNodeB operable to resolve predefined types of concurrent communications at a relay user equipment (UE) is disclosed. The eNodeB can identify the relay UE that is configured to relay proximity services (ProSe) traffic between the eNodeB and a remote UE. The relay UE can be in-coverage of the eNodeB and the remote UE can be in-coverage or out-of-coverage of the eNodeB. The eNodeB can communicate control signaling to at least one of the relay UE and the remote UE to resolve predefined types of communications performed at the relay UE or the remote UE to defined subframes. The control signaling can provide concurrency avoidance at the relay UE for predefined types of concurrent communications between the relay UE and at least one of the eNodeB and the remote UE.

18 Claims, 9 Drawing Sheets

(56) References Cited

OTHER PUBLICATIONS

3GPP TSG RAN WG1 #80bis (R1-152240); WF on Relay UE Concurrent Processes; Agenda item: 7.2.3.2.1; Belgrade, Serbia; Apr. 20-24, 2014.
LG Electronics.; "Multiplexing of Uu and D2D Communication." 3GPP TSG R1-1351482; (Nov. 11-15, 2013); RAN WG1 Meeting #75, San Francisco, US; (Agenda 6.2.8.1.3) 5 Pages.

REDUCTION OF CONCURRENT SIGNALING IN A RELAY USER EQUIPMENT (UE)

RELATED APPLICATIONS

The present application is a continuation of U.S. patent application Ser. No. 15/566,643 filed Oct. 13, 2017 which is a 371 nationalization of PCT/US2015/066152 filed Dec. 16, 2015 which claims the benefit of U.S. Provisional Patent Application No. 62/161,590 filed May 14, 2015, the entire specifications of which are each hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL) and sidelink (SL) transmissions. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
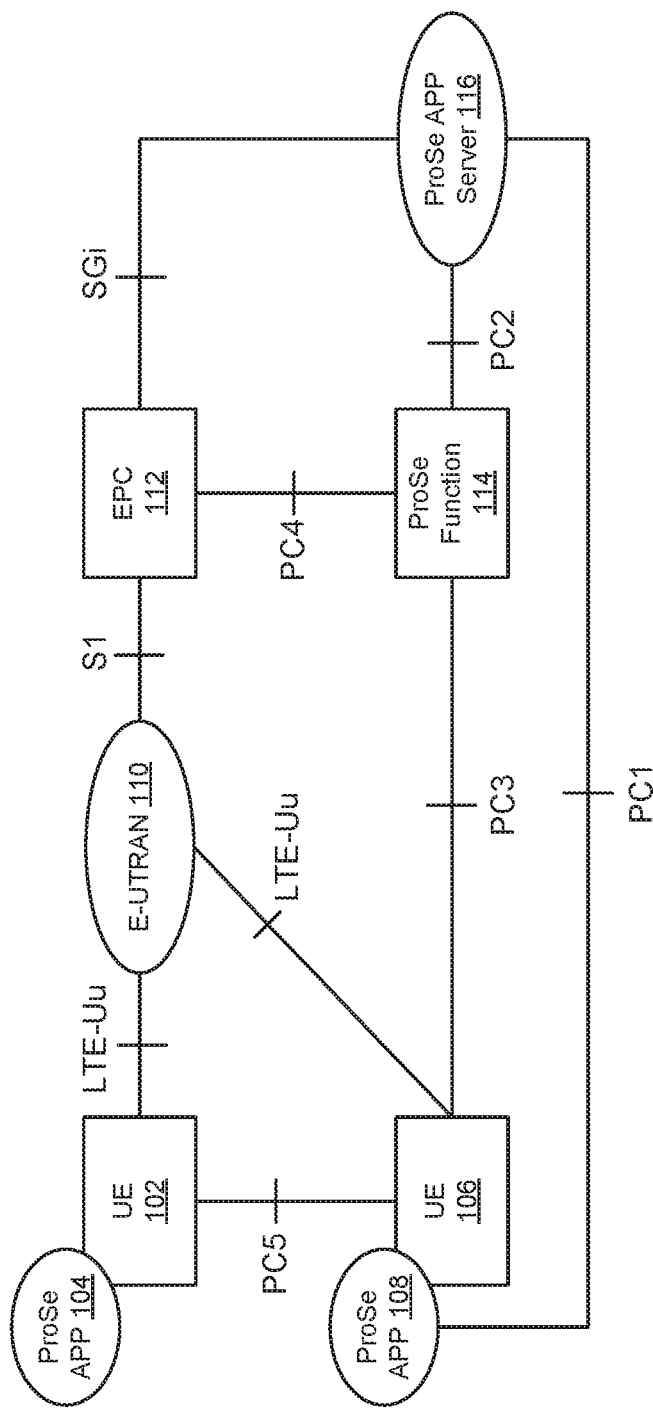
FIG. 1 illustrates a device-to-device (D2D) communication architecture in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Device to device (D2D) communication, which can also be referred to as proximity services (ProSe), for Evolved Universal Terrestrial Radio Access (E-UTRA) or Long Term Evolution (LTE) is being standardized as of 3GPP LTE Release 12. The D2D feature enables the direct communication of data between user equipments (UEs) over the cellular radio spectrum, but without the data being carried by the cellular network infrastructure. Within 3GPP, the D2D communication feature can be referred to as ProSe (Proximity Services) Direct Communication. In Release 12 and 13, D2D is primarily targeted for public safety use cases. Therefore, public safety workers can communicate with each other using radio frequency (RF) communications when there is no LTE connection available. In this use case, there is no reliance on network coverage. However, for future releases, commercial applications of D2D are also considered.

In Release 12, there are several D2D features that are covered, such as ProSe device to device discovery in network coverage. ProSe discovery refers to the process by which one UE detects and identifies another UE in proximity using E-UTRAN radio signals. Other D2D features include ProSe device to device broadcast communication, and higher layer (e.g., access stratum (AS) layer) support to enable groupcast (e.g., broadcast or multicast) and unicast over a physical layer broadcast communication.

FIG. 1 illustrates an exemplary device-to-device (D2D) discovery and communication architecture. More specifically, FIG. 1 illustrates a D2D/ProSe non-roaming reference architecture. A first UE 102 can be connected to a E-UTRAN 110 over a first LTE-Uu interface, and a second UE 106 can be connected to the E-UTRAN 110 over a second LTE-Uu interface. The first UE 102 can execute a first ProSe application 104 and the second UE 106 can execute a second ProSe application 108. The first UE 102 and the second UE 106 can be connected via a PC5 interface. In other words, the PC5 interface is the communication link between the two ProSe enabled UEs 102, 106 in direct communication.

In one example, the E-UTRAN 110 can be connected to an Evolved Packet Core (EPC) 112 via an S1 interface. The EPC 112 can be connected to a ProSe function 114 via a PC4 interface, and the EPC 112 can be connected to a ProSe application server 116 over an SGi interface. The ProSe function 114 and the ProSe application server 116 can be connected via a PC2 interface. In addition, one of the UEs can be connected to the ProSe function 114 and the ProSe application server 116. For example, the second UE 106 can be connected to the ProSe function 114 over a PC3 interface, and the second ProSe application 108 that executes on the second UE 106 can be connected to the ProSe application server 116 via a PC1 interface.

Release 13 aims to introduce enhancements to LTE D2D communications and discovery meeting requirements for public safety for: (1) in-network coverage (intra-cell and inter-cell), (2) partial network coverage, and (3) outside network coverage scenarios. For non-public safety discovery, the enhancements to LTE D2D communications can be for in-network coverage (intra-cell and inter-cell).

In addition, Release 13 aims to support the extension of network coverage using layer 3 (L3)-based ProSe UE-to-Network Relays. A ProSe UE-to-Network relay can also be referred to as a relay UE. The relay UE can perform a ProSe UE-to-Network Relay function, which supports the relay of unicast traffic to remote UEs that are not served by the E-UTRAN and the network. In other words, the relay UE can act as a relay between the network and the remote UE that is out-of-coverage. The relay UE will be in-coverage with the network in order to forward the data to the out-of-coverage remote UE. The relay UE can relay unicast traffic in both uplink (UL) and downlink (DL). In other words, the relay UE can forward information from the remote UE in uplink to the network, as well as forward information from the network in downlink to the remote UE. The relay UE can enhance coverage to UEs that are outside the network. The relay UE can provide a generic L3 forwarding function that can relay Internet Protocol (IP) traffic that is relevant for public safety communication. In addition, the relay UE can relay IP traffic (e.g., voice data, video data) to support service continuity for the remote UE.

In one example, the network (e.g., an eNodeB) can control the initiation of the ProSe UE-to-Network Relay feature. The eNodeB can control the initiation of the ProSe UE-to-Network Relay feature per cell or per relay UE or both. The relay UE can be initiated or configured to act as a relay while a connection is established between the relay UE and the network. A given UE (i.e., the remote UE) can (re)select the relay UE, and then a connection can be established between the remote UE and the relay UE. At this point, the relay UE can forward data from the network to the remote UE, or vice versa.

Figure 2:
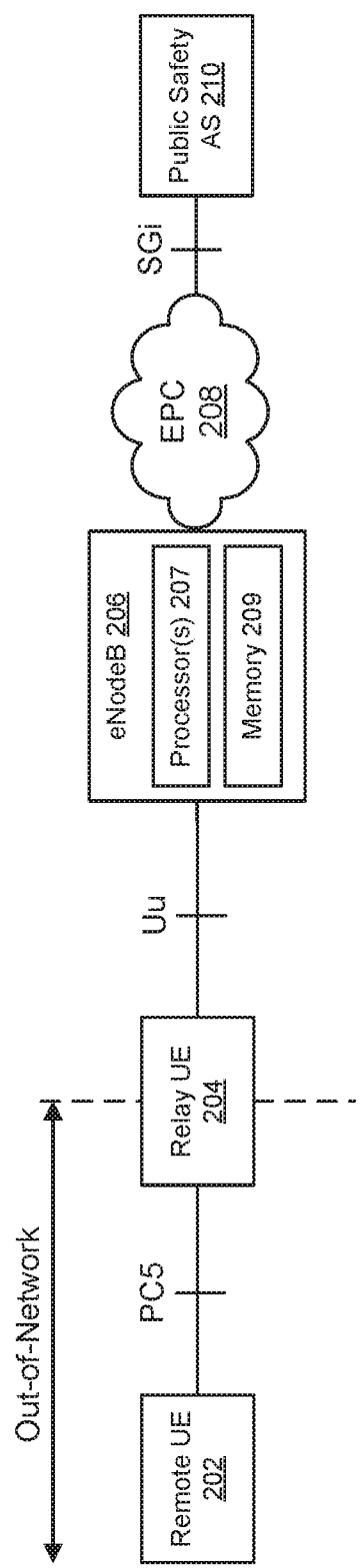
FIG. 2 illustrates a relay user equipment (UE) acting as a relay between a remote UE and an eNodeB in accordance with an example.

FIG. 2 illustrates an example of a relay user equipment (UE) 204 acting as a relay between a remote UE 202 and an eNodeB 206. The eNodeB 206 can include processor (2) 207 and memory 209. The relay UE 204 can also be referred to as a ProSe UE-to-Network Relay. The relay UE 204 can be connected to the eNodeB 206 via a Uu interface. Therefore, the relay UE 204 can be in-coverage with respect to the network. The remote UE 202 can be out-of-coverage. The remote UE 202 may not be directly connected to the eNodeB 206, but rather is directly connected to the relay UE 204 via a PC5 interface. The relay UE 204 can act as an intermediary between the remote UE 202 that is out-of-coverage and the eNodeB 206. The eNodeB 206 can be part of an Evolved Packet Core (EPC) 208, and the eNodeB 206 can be connected to a public safety application server (AS) 210 via an SGi interface.

Figure 3A:
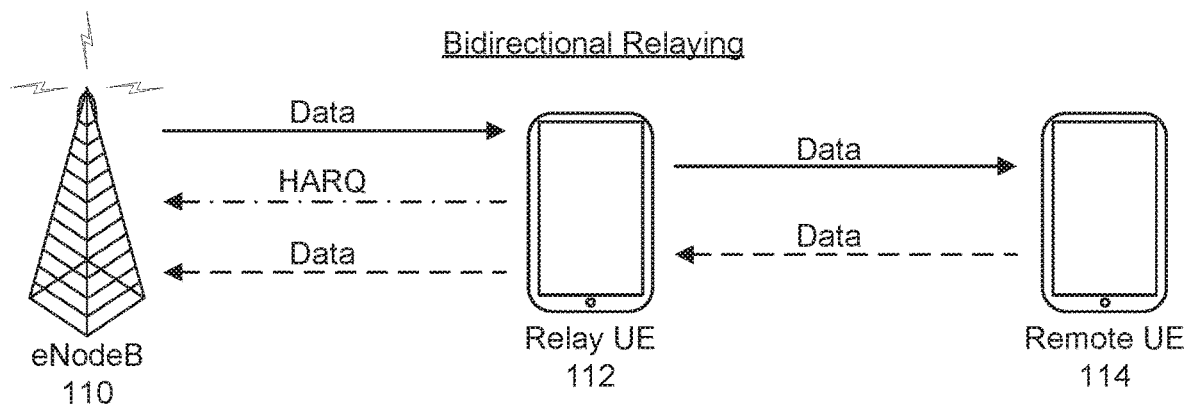
FIGS. 3A-3C illustrate signaling between a relay user equipment (UE), a remote UE and an eNodeB in accordance with an example.
Figure 3B:
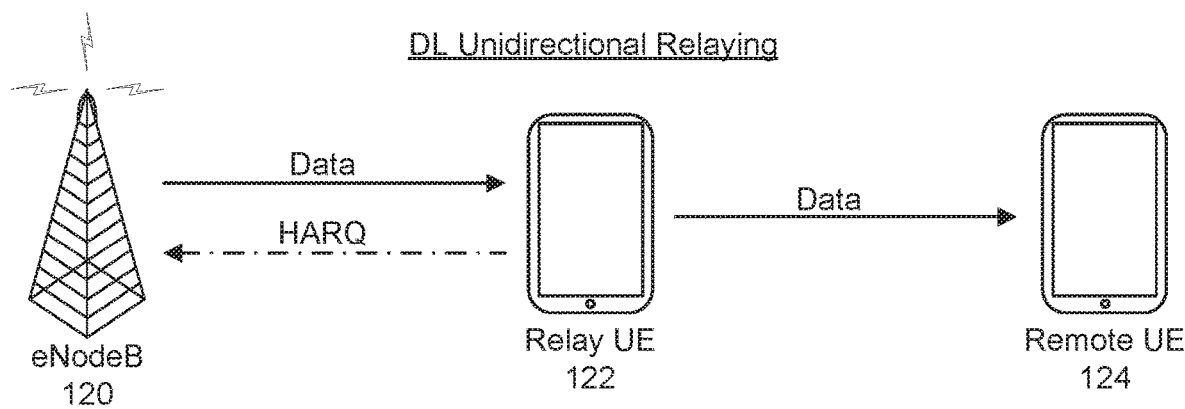
Figure 3C:
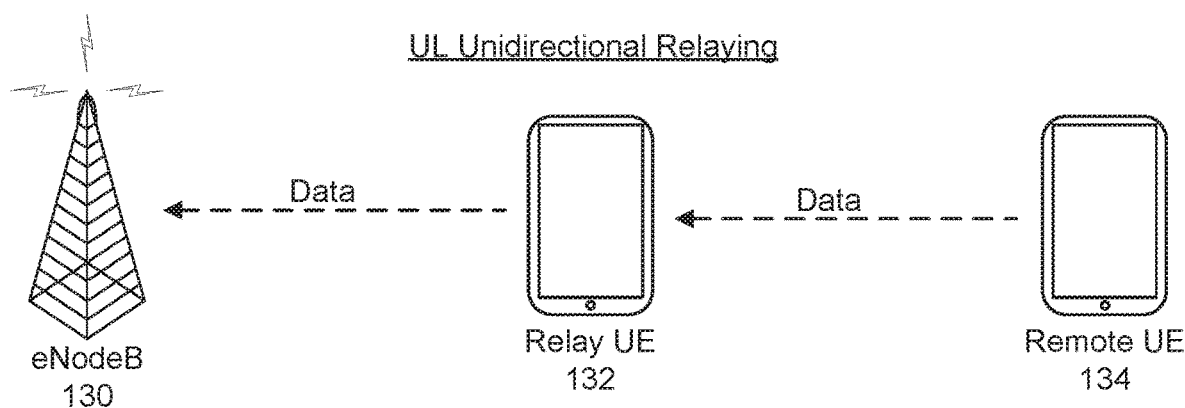

FIGS. 3A-3C illustrate exemplary signaling between a relay user equipment (UE), a remote UE and an eNodeB. The relay UE (or UE-to-NW relay node) can serve as a terminal that relays traffic to or from a remote UE (e.g., an out-of-coverage UE). As shown in FIG. 3A, a relay UE 112 can operate in a bidirectional relaying mode. For example, the relay UE 112 can receive data from an eNodeB 110 and forward the data to a remote UE 114. The relay UE 112 can receive data from the remote UE 114 and forward the data to the eNodeB 110. In addition, the relay UE 112 can transmit hybrid automatic repeat request (HARQ) information to the eNodeB 110. The bidirectional relaying mode can operate as follows: eNodeB↔$UE_R$↔$UE_{OOC}$. As shown in FIG. 3B, a relay UE 122 can operate in a downlink unidirectional relaying mode. For example, the relay UE 122 can receive data from an eNodeB 120 and forward the data to a remote UE 124. In addition, the relay UE 122 can transmit hybrid automatic repeat request (HARQ) information to the eNodeB 120. The downlink unidirectional relaying mode can operate as follows: eNodeB→$UE_R$→$UE_{OOC}$. As shown in FIG. 3C, a relay UE 132 can operate in an uplink unidirectional relaying mode. For example, the relay UE 132 can receive data from a remote UE 134 and forward the data to an eNodeB 130. UE 114. The uplink unidirectional relaying mode can operate as follows: eNodeB←$UE_R$←$UE_{OOC}$. From the physical layer perspective, these relaying modes are different in terms of UE behavior, as further discussed below.

In one example, when access links (i.e., between the relay UE and the remote UE) and backhaul links (i.e., between the eNodeB and the relay UE) are on the same carrier, the following concurrent processes can be identified at the relay UE from the physical layer perspective: Process 1 refers to the transmission of D2D data from the relay UE to the remote UE. In LTE Release 12, this process is controlled by the eNodeB for sidelink transmission mode-1 (STM #1) or by the relay UE in STM #2. In STM #1, the eNodeB controls D2D transmission resources, whereas in STM #2, the UE (e.g., the relay UE) can select D2D transmission resources from a predefined pool of transmission resources. Process 2 refers to the reception of D2D data at the relay UE from the remote UE. In LTE Release 12, this process is controlled by the remote UE in STM #2. In LTE Release 13, new functionality can be added, such that this process is controlled by the relay UE and/or the eNodeB. Process 3 refers to the transmission of cellular data from the relay UE to the eNodeB. In this case, the cellular data is that of the relay UE, and not the remote UE's data. This process can be controlled by the eNodeB.

In one example, there are two concurrent processes at the relay UE: Process 1 refers to the reception of data at the remote UE from the relay UE. Process 2 refers to the transmission of data from the remote UE to the relay UE.

Based on analysis of bidirectional and unidirectional UE-to-NW relaying types, in the case of bidirectional relaying, there are three types of concurrency at the relay UE. In other words, at the relay UE, there are three situations in which communications to the remote UE and/or the eNodeB may possibly overlap or conflict with each other. In Type A, the relay UE can transmit D2D data to the remote UE (Process 1) and the relay UE can transmit cellular data to the eNodeB (Process 3). In Type B, the relay UE can receive D2D data from the remote UE (Process 2) and the relay UE can transmit cellular data to the eNodeB (Process 3). In Type C, the relay UE can transmit D2D data to the remote UE (Process 1) and the relay UE can receive D2D data from the remote UE (Process 2).

In one example, the relay UE can use only uplink subframes to perform D2D communications with the remote UE in time-division duplexing (TDD) or frequency-division duplexing (FDD), which can limit the impact of D2D communications on existing LTE networks. In other words, the relay UE can use uplink subframes to transmit D2D data to the remote UE, and the relay UE can receive D2D data from the remote UE using uplink subframes. In addition, the relay UE can communicate its own cellular data to the eNodeB using uplink subframes. Since the relay UE performs all three types of communications using uplink subframes, it is possible for these communications to conflict with each other in the same uplink subframe. For example, the relay UE may attempt to use the same uplink subframe to send D2D data to the remote UE and send cellular data to the eNodeB (Type A). In another example, the relay UE may attempt to use the same uplink subframe to receive D2D data from the remote UE and send cellular data to the eNodeB (Type B). In yet another example, the relay UE may attempt to use the same uplink subframe to send D2D data to the remote UE and receive D2D data from the remote UE (Type C). On the other hand, the relay UE can receive cellular data from the eNodeB in dedicated downlink subframes, so downlink cellular transmissions do not conflict with the D2D communications and uplink D2D transmissions at the relay UE. In order to enhance D2D communication for L3 UE-to-NW relaying support, the coordination or alignment of resources among the eNodeB and the relay UE, as well as the relay and remote UEs, may be needed.

The present technology provides novel techniques to handle concurrent processes at the relay UE and the remote UE in order to avoid performance loss at the access and backhaul links when L3 based D2D relaying is applied. In other words, various techniques can be applied to prevent the relay UE from attempting to perform D2D communications and/or cellular transmissions in the same uplink subframes. By applying these various techniques, conflicts at the relay UE can be avoided (i.e., D2D and cellular communications with the eNodeB and the remote UE can be configured such that they will not occur in overlapping subframes).

In one example, additional physical or higher layer signaling can be introduced to facilitate control of the relay and remote UE transmission timelines (to reduce concurrency at the relay UE). These transmission timelines can be coordinated by the eNodeB or the relay UE, depending on the applied sidelink transmission mode and the location of the remote UE (e.g., in-coverage or out of network coverage). In order to facilitate resource alignment aimed to reduce concurrency and simplify the UE-to-NW relaying, physical layer signaling or higher layer signaling can be utilized. For example, medium access control (MAC)-layer signaling, radio resource control (RRC)-layer signaling, or the PC5 signaling protocol can be used to control time transmission patterns for D2D data and sidelink control information (SCI). In addition, since the relay and remote UEs can have different traffic types, additional prioritization rules can be introduced to handle different traffic types. Examples of traffic types can include cellular traffic (between the relay UE and the eNodeB), relay traffic (between the remote UE and the relay UE, or between the relay UE and the eNodeB), direct traffic (between the remote and relay UEs), and discovery traffic (between the remote and relay UEs).

In one example, the physical or higher layer signaling from the eNodeB can function to control the transmission timelines of the relay UE, thereby reducing a likelihood of concurrent communications at the relay UE. The transmission timelines controlled by the eNodeB can include a relay UE sidelink (or D2D) transmission timeline, a relay UE sidelink (or D2D) reception timeline, and a relay UE cellular transmission timeline.

In one example, the relay UE sidelink (or D2D) transmission timeline, which corresponds to Process 1, can indicate subframes that are used by the relay UE for D2D transmissions to the remote UE. In general, the relay UE sidelink transmission timeline can include subframes that belong to physical sidelink control channel (PSCCH) and physical sidelink shared channel (PSSCH) resource pools, or only a PSSCH resource pool.

In one example, the relay UE sidelink (or D2D) reception timeline, which corresponds to process 2, can indicate subframes that are used by the relay UE for D2D receptions from the remote UE. This relay UE sidelink (or D2D) reception timeline can also be referred to as a remote UE sidelink (or D2D) transmission timeline. In general, the relay UE sidelink (or D2D) reception timeline can include subframes that belong to PSCCH and PSSCH resource pools, only a PSSCH resource pool.

In one example, the relay UE cellular transmission timeline, which corresponds to process 3, can indicate uplink (UL) subframes that are used for cellular transmissions from the relay UE to the eNodeB. The relay UE cellular transmission timeline can be logically divided into a HARQ transmission timeline to acknowledge downlink reception, and an uplink data transmission timeline in which the relay UE communicates to the eNodeB. In one example, both timelines can cross in the same uplink subframe when HARQ feedback is multiplexed with a physical uplink shared channel (PUSCH).

In one example, the relay UE can also be associated with a relay UE cellular transmission timeline, which indicates downlink subframes that are used for cellular data reception from the eNodeB. However, there is no concurrency in terms of cellular reception because these downlink subframes are not used for D2D communications and uplink cellular transmissions from the relay UE. In other words, downlink cellular transmissions at the relay UE may not conflict with the three processes described above.

Figure 4:
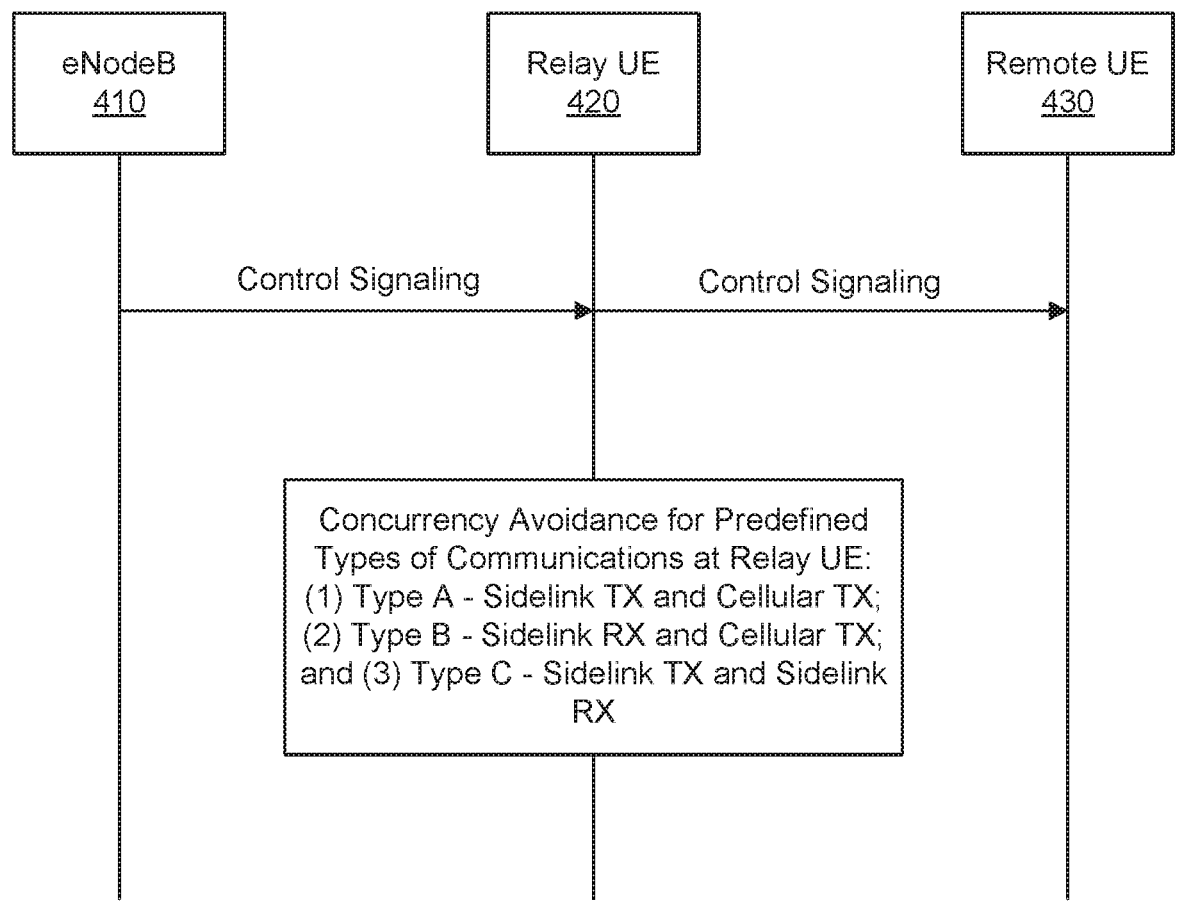
FIG. 4 illustrates control signaling between an eNodeB and a relay user equipment (UE) and a remote UE for resolving predefined types of concurrent communications at the relay UE in accordance with an example.

FIG. 4 illustrates exemplary control signaling between an eNodeB 410 and a relay user equipment (UE) 420 and a remote UE 430 for resolving predefined types of concurrent communications at the relay UE 420. The control signaling communicated from the eNodeB 410 can be physical layer signaling or higher layer signaling. As previously described, the predefined types of concurrent communications at the relay UE 420 can include: (1) a D2D transmission from the relay UE 420 to the remote UE 430 that conflicts with a cellular transmission from the relay UE 420 to the eNodeB 410; or (2) a D2D reception at the relay UE 420 from the remote UE 430 that conflicts with a cellular transmission from the relay UE 420 to the eNodeB 430; or (3) a D2D transmission from the relay UE 420 to the remote UE 430 that conflicts with a D2D reception at the relay UE 420 from the remote UE 430. The predefined types of concurrent communications can correspond to Type A, Type B and Type C, respectively. Therefore, the relay UE 420 and/or the remote UE 430 can receive the control signaling from the eNodeB 410, and the control signaling can provide concurrency avoidance for the predefined types of concurrent communications at the relay UE 420.

The operation and principles of concurrency avoidance at the relay UE 420 for different sidelink (or D2D) transmission modes (or STMs) is explained below. In sidelink transmission mode 1 (STM #1), the eNodeB 410 can control D2D transmission resources. In STM #2, the UE (e.g., the relay UE 420 and/or the remote UE 430) can select D2D transmission resources from a pre-defined transmission pool.

With respect to sidelink transmission mode 1 (STM #1), the eNodeB 410 can control a resource pool configuration for sidelink control channels and data channels, such as a physical sidelink control channel (PSCCH) and a physical sidelink shared channel (PSSCH). In STM #1, the resource pool configuration includes all uplink (UL) subframes except for the PSCCH. In addition, the eNodeB 410 can control time frequency resource allocation for the transmission of sidelink control information (e.g., resource for PSCCH transmission—$n_{PSCCH}$) and sidelink data (e.g., time resource pattern ($I_{TRP}$), hopping, resource block assignment and hopping resource allocation) of each D2D transmitter. Using higher layer signaling, the eNodeB 410 can also configure a predefined modulation and coding scheme ($I_{MCS}$) for transmission by the relay UE 420. In one example, if the $I_{MCS}$ is not pre-configured by the eNodeB 410, the relay UE 420 and the remote UE 430 can select the $I_{MCS}$ autonomously.

With respect to STM #1 and a Type A concurrency at the relay UE 420 (i.e., a sidelink transmission (TX) and cellular TX concurrency at the relay UE 420), the eNodeB 410 can fully control relay UE sidelink (or D2D) and cellular transmission patterns. Therefore, the Type A concurrency can be fully resolved by eNB scheduling. As a result, based on the eNodeB's scheduling, the relay UE 420 can resolve the Type A concurrency by not attempting to transmit sidelink data to the remote UE 430 and transmit cellular data to the eNodeB 410 using the same subframe. In one example, additional mechanisms can be considered to avoid Type A concurrency, such as the eNodeB 410 configuring a resource pool and/or a cellular transmission pattern configuration for the relay UE 420.

With respect to STM #1 and a Type B concurrency at the relay UE 420 (i.e., a sidelink reception (RX) and cellular TX concurrency at the relay UE 420), the eNodeB 410 can directly control cellular transmissions of the relay UE 420. In order to avoid conflicts with sidelink reception at the relay UE 420, the eNodeB 410 can utilize various mechanisms for managing the sidelink receptions at the relay UE 420, which can be similar to those described for Type C concurrency resolution below. In one example, the eNodeB 410 can (pre-) configure a resource pool (i.e., a defined resource pool of subframes) for sidelink receptions at the relay UE 420 (which correspond to sidelink transmissions at the remote UE 430). In other words, the eNodeB 410 can limit or resolve the relay UE 420 to only utilize certain subframes for sidelink receptions from the remote UE 430. In addition, the eNodeB 410 can perform scheduling, such that the relay UE 420 avoids cellular UL transmissions on these subframes. In another example, the eNodeB 410 can (pre-) configure a subset of Time Resource Patterns (T-RPTs) to be used for transmission by the remote UE 430 and the relay UE 420. In yet another example, the eNodeB 410 can send, to the remote UE 430, a sidelink grant to indicate sidelink transmission resources for the remote UE 430. The sidelink grant can be transmitted to the remote UE 430 via the relay UE 420, or the grant can be transmitted using DL cellular resources, depending on whether the remote UE 430 is in-coverage or out of coverage and the remote UE's connection status with the eNodeB 410. Based on these various mechanisms (i.e., the control signaling communicated from the eNodeB 410), the relay UE 420 can resolve the Type B concurrency by not attempting to receive sidelink data from the remote UE 430 and transmit cellular data to the eNodeB 410 using the same subframe.

With respect to STM #1 and a Type C concurrency at the relay UE 420 (i.e., a sidelink TX and sidelink RX concurrency at the relay UE 420), the Type C concurrency can be controlled by the eNodeB 410 or the relay UE 420 or the remote UE 430, and can depend on whether the remote UE 430 is in coverage or out of coverage. The eNodeB 410 can provide control signaling to the relay UE 420 and/or the remote UE 430, such that the relay UE 420 can resolve the Type C concurrency by not attempting to receive sidelink data from the remote UE 430 and transmit sidelink data to the remote UE 430 using the same subframe.

When the remote UE 430 is in-coverage (Scenario 1), the eNodeB 410 can directly send a sidelink grant to both the relay UE 420 and the remote UE 430. The sidelink grant can be in accordance with downlink control information (DCI) Format 5 or a new DCI Format X. The sidelink grant can indicate a set of transmission parameters to each of the relay UE 420 and the remote UE 430. The transmission parameters can include a resource for PSCCH (e.g., scheduling assignment resource—$n_{PSCCH}$). The indication of the PSCCH resource can be approximately 6 bits. The transmission parameters can include a Transmit Power Control (TPC command), which can be approximately one bit. The TPC command can be an indicator of a maximum amount of power or an open loop uplink (UL) power control (PC). The TPC command can be applicable to a primary sidelink synchronization signals (PSSS) and secondary sidelink synchronization signals (SSSS), a physical sidelink broadcast channel (PSBCH) and/or a Mode 1 PSSCH/PSCCH. In addition, the transmission parameters can include sidelink control information (SCI) format 0 fields (SCI Format 0), which can include a frequency hopping flag, a resource block assignment and hopping resource allocation, and a time resource pattern (T-RPT or $I_{TRP}$). Based on the control signaling (e.g., transmission parameters) received from the eNodeB 410, the relay UE 420 can resolve the Type C concurrency by not attempting to transmit sidelink data to the remote UE 430 and receive sidelink data from the remote UE 430 using the same subframe.

In an alternative mechanism to control concurrency at the relay UE 420 in Scenario 1 (i.e., remote UE 430 is in coverage) is to reuse mechanisms defined for Scenario 2 (i.e., the remote UE 430 is out of coverage), as described below.

When the remote UE 430 is out of coverage (Scenario 2), the eNodeB 410 can utilize various mechanisms for performing concurrency avoidance at the relay UE 420. In one example, the eNodeB 410 can (pre-) configure two resource pools (i.e., two defined resource pools of subframes) for the relay UE 420—a first resource pool for sidelink transmissions to the remote UE 430 and a second resource pool for sidelink receptions from the remote UE 430. In other words, the eNodeB 410 can limit or resolve the relay UE 420 to only utilize certain subframes for sidelink receptions from the remote UE 430, as well as limit or resolve the relay UE 420 to only utilize certain subframes for sidelink transmissions to the remote UE 430. In another example, the eNodeB 410 can (pre-) configure a subset of Time Resource Patterns (T-RPTs) or PSCCH resources to be used for sidelink transmissions by the remote UE 430, as well as sidelink receptions and sidelink transmissions by the relay UE 420 and the remote UE 430, respectively. In yet another example, the eNodeB 410 can transmit two sidelink grants to the relay UE 420. The sidelink grants can be in accordance with downlink control information (DCI) Format 5 or a new DCI Format X. The two sidelink grants can correspond to the sidelink transmission resources for the relay UE 420 and the remote UE 430, respectively.

In one example, the relay UE 420 can distinguish these two sidelink grants of transmission resources using various mechanisms. In other words, the relay UE 420 can determine which of the two sidelink grants is for the relay UE 420 and which of the two sidelink grants is for the remote UE 430. In one example, the two sidelink grants can be configured with different D2D radio network temporary identifiers (RNTIs). For example, a first RNTI (e.g., D2D_RNTI_TX) can be associated with D2D transmissions and a second RNTI (e.g., D2D_RNTI_RX) can be associated with D2D receptions.

In one example, in order for the relay UE 420 to distinguish between the two sidelink grants, the sidelink grants can be associated with predefined association rules. For example, even subframes can be associated with the sidelink grant for the relay UE 420 and odd subframes can be associated with the sidelink grant for the remote UE 430. In another example, a PDCCH or enhanced PDCCH (ePDCCH) first control channel element (CCE) can be utilized to indicate whether a particular sidelink grant is for the relay UE 420 or the remote UE 430.

In one example, in order for the relay UE 420 to distinguish between the two sidelink grants, the eNodeB 410 can utilize a DCI Format cyclic redundancy check (CRC) or payload scrambling mechanism to differentiate between the transmission and reception resources. In addition, a scrambling seed value can be changed based on a destination relay UE 420 or remote UE 430. In another example, another seed can be used for initialization or generation of demodulation reference signal (DMRS) sequences if the sidelink grant is sent to the remote UE 430. In one example, a new sidelink DCI Format (DCI Format X) can be introduced to carry resources for both the remote and relay UEs, or for the remote UE 430 only. In addition, other pre-specified rules can be defined or re-interpretation of fields can be considered. As an alternative, the resources used for sidelink receptions at the relay UE 430 can be derived using pre-defined association rules, which can take relay UE transmission parameters as input. The relay UE transmission parameters can include $I_{TRP}$ and $n_{PSCCH}$ carried in DCI Format 5 or a new DCI Format, e.g., ($I_{TRP-RX}$, $n_{PSCCH-RX}$)=function($I_{TRP-TX}$, $n_{PSCCH-RX}$), or vice versa.

In one configuration, the relay UE 420 can forward a set of parameters to the remote UE 430, such as $I_{MCS}$, $I_{TRP}$, $n_{PSCCH}$, to enable sidelink transmissions at the remote UE 430. The relay UE 420 can send the set of parameters over a sidelink control channel (e.g., PSCCH) using physical layer signalling or via a sidelink data channel (e.g., PSSCH) using higher layer control signalling, such as MAC, RRC, PC5 signalling protocol, etc. If the sidelink control channel (e.g., PSCCH) is used to transmit the parameters, then the remote UE 430 can exhibit one of a first behavior or a second behavior. In the first behavior, upon reception of sidelink control information from the relay UE 420, the remote UE 430 can directly respond with a D2D data transmission in an associated PSSCH resource pool. In one example, the remote UE 430 can receive the transmission parameters from the relay UE 420 using resources in a Mode-1 PSCCH pool, and the remote UE 430 can retransmit control information to the relay UE 420 using resources in Mode-2 pools (e.g., PSCCH and PSSCH) or the remote UE 430 can retransmit control information to the relay UE 420 using only resources in a Mode-1 pool (e.g., PSSCH). In the second behavior, upon reception of sidelink control information from the relay UE 420, the remote UE 430 can interpret the reception of the sidelink control information as an instruction to use the indicated resources starting from a next sidelink transmission in the PSSCH/PSCCH resource pools, unless a further instruction from the relay UE 420 overwrites the previous transmission settings of the remote UE 430. In addition, the second behavior can be applicable when higher layer control signaling is used to set the transmission parameters of the remote UE 430.

In one configuration, with respect to the first behavior, the remote UE 430 can distinguish whether the sidelink control information (also known as a scheduling assignment) is for sidelink receptions (as SCI Format-0) at the remote UE 430 or whether the sidelink control information is for sidelink transmissions at the remote UE 430. Several mechanisms can be utilized to enable the remote UE 430 to make such a differentiation. In one example, the PSCCH resources can be associated with a sidelink transmission indication or a sidelink reception indication. For example, an even PSCCH resource index can designate a sidelink reception at the remote UE 430 and an odd PSCCH resource index can designate a sidelink transmission at the remote UE 430. In addition, other resource association mechanisms can be applied as well. In one example, a new SCI format X can be used to distinguish whether the sidelink control information (or grant from the relay UE 420) is for sidelink receptions at the remote UE 430 or for sidelink transmissions at the remote UE 430. In another example, existing SCI-Format 0 fields can be reinterpreted, such that the approximately 10 bits defined for reception timing adjustments for Mode-1 operations can be reused with respect to Mode-2 sidelink transmissions by the remote UE 430.

In another example, the indication can be provided as a layer 2 (L2) identity of the remote UE 430 (or destination) and an L2 identity of the relay UE 420 (or source) or other connection ID information, and a position of a source and destination address can be exchanged. In previous solutions, the SCI format includes a layer 1 (L1) identity 8-bit field, which is part of a larger ProSe L2 group identity. The L1 identity field is used to indicate for which UE the transmission is intended, and the L1 identity can be interpreted as a destination L1 identity. Here, the destination L1 identity can be replaced with a source L1 identity. Thus, the remote UE 430 can distinguish which SCI is for reception (with a conventional L1 ID, i.e., the remote UE's L1 ID) and which SCI is for transmission (with an L1 ID of the relay UE 420).

In yet another example, the remote UE 430 can perform the differentiation based on a PSCCH sidelink control information scrambling mechanism. The scrambling mechanism can be initialized with a new value, which can be used to distinguish whether the sidelink control information (or grant from the relay UE 420) is for sidelink receptions at the remote UE 430 or for sidelink transmissions at the remote UE 430. In addition, while in traditional solutions, PSCCH transmissions are initialized with the same scrambling seed value (e.g., 510), the new value can be a function of the relay and remote UE identities (e.g., L2 identities).

In one example, the remote UE 430 can utilize resources for Mode-1 transmissions, or the remote UE 430 can utilize any other resource pools configured by the eNodeB 410 for sidelink transmissions at the remote UE 430. In one example, a transmission timing of the remote UE 430 can be associated with an UL transmission timing if the remote UE 430 is in-coverage, or the transmission timing can be associated with a DL transmission timing if the remote UE 430 is out of coverage.

In one example, higher layer signaling can be used to indicate resources used for sidelink transmissions at the remote UE 430 when the remote UE 430 is in-coverage or out-of-coverage. The higher layer signaling can introduce linkage between a Mode-1 control/data pool and a Mode-2 control/data pool. For example, when the relay UE 420 uses the PSCCH to indicate the transmission parameters for the remote UE 430, the remote UE 430 can apply the transmission parameters in the Mode-2 pool linked with the Mode-1 pool.

With respect to sidelink transmission mode 2 (STM #2), the eNodeB 410 can utilize similar mechanisms to resolve concurrency at the relay UE 420, as described above. In STM #2, the UE (e.g., the relay UE 420 and/or the remote UE 430) can select D2D transmission resources from a pre-defined transmission pool, whereas in STM #1, the eNodeB 410 can control the D2D transmission resources utilized by the relay UE 420 and/or the remote UE 430.

With respect to STM #2 and a Type A concurrency at the relay UE 420 (i.e., a sidelink transmission (TX) and cellular TX concurrency at the relay UE 420), the eNodeB 410 can fully control a cellular transmission pattern of the relay UE 420, but the eNodeB 410 is not aware of a sidelink transmission pattern of the relay UE 430. In this case, the eNodeB 410 can utilize higher layer signaling to control the transmission pattern of the relay UE 420, or the eNodeB 410 can configure a subset of transmission patterns from which the relay UE 420 can select an appropriate pattern for sidelink control and data transmissions with the remote UE 430. As a result, the relay UE 420 can resolve the Type A concurrency.

With respect to STM #2 and a Type B concurrency at the relay UE 420 (i.e., a sidelink reception (RX) and cellular TX concurrency at the relay UE 420), the eNodeB 410 can directly control the cellular transmissions of the relay UE 420. In order to avoid conflicts with sidelink receptions at the relay UE 420, either the eNodeB 410 or the relay UE 420 can utilize similar mechanisms as described above for Type C concurrency. For example, the eNodeB 410 or the relay UE 420 can (pre-) configure or signal a defined resource pool of subframes for sidelink receptions from the remote UE 430 and utilize scheduling to avoid cellular UL transmissions of the relay UE 420 on these subframes. In another example, the eNodeB 410 or the relay UE 420 can (pre-) configure a subset of T-RPT patterns or PSCCH resources to be used for sidelink transmissions by the remote UE 430 and for sidelink receptions of the relay UE 420. In yet another example, the eNodeB 410 or the relay UE 420 can indicate (via a grant) sidelink transmission resources for the remote UE 430. The grant can be transmitted by the relay UE 420 or via a cellular link between the eNodeB 410 and the remote UE 430 depending on whether the remote UE 430 is in-coverage or out of coverage. As a result, the relay UE 420 can resolve the Type B concurrency.

With respect to STM #2 and a Type C concurrency at the relay UE 420 (i.e., a sidelink TX and sidelink RX concurrency at the relay UE 420), the Type C concurrency can be resolved when the remote UE 430 is out of coverage. As an example, the eNodeB 410 can (pre-) configure two resource pools using higher layer signalling—a first resource pool can be for sidelink transmissions to the remote UE 430 and a second resource pool can be for sidelink receptions from the remote UE 430. In another example, the eNodeB 410 can (pre-) configure a subset of T-RPT patterns to be used for sidelink transmission at the relay UE 420, as well as for sidelink receptions and sidelink transmissions at the remote UE 430, respectively. In yet another example, the eNodeB 410 can transmit two sidelink grants to the relay UE 410. The sidelink grants can be in accordance with DCI Format 5 or a new DCI Format X. The two sidelink grants can correspond with the sidelink transmission resources for the relay UE 420 and the remote UE 430, respectively. The relay UE 420 can distinguish between the two grants using various mechanisms, as described above.

In one configuration, the eNodeB 410 may not be involved in the concurrency resolution of all concurrent types. For example, the Type C concurrency can be resolved directly between the relay UE 420 and the remote UE 430. The relay UE 420 can provide transmission parameters to the remote UE, or vice versa. Alternatively, both the relay and remote UEs can negotiate transmission resources using physical or higher layer signaling (e.g., MAC, RRC, and PC5 Signaling Protocol). In order to avoid conflicts with cellular transmissions, the relay UE 420 can indicate the transmission resources to the remote UE 430 in a manner, such that the indication is part of a relay UE transmission resource granted by the eNodeB 410.

In one configuration, relay UEs and remote UEs can have additional traffic types, such as direct traffic with other D2D capable UEs and cellular traffic with the eNodeB. In one example, the relay UE can implement a prioritization scheme between the different types of traffic, or alternatively, the eNodeB can configure a prioritization scheme for the relay UE. Since the relay operation involves the eNodeB and cellular transmissions, in one example, cellular transmissions to and from the network can be prioritized over other direct transmissions.

For relay and remote UE transmissions, the prioritization scheme can be defined as follows: cellular transmissions can be assigned a first priority level (a highest priority), UE-to-NW relay transmissions can be assigned a second priority level, direct transmissions can be assigned a third priority level, and discovery transmissions can be assigned a fourth priority level (a lowest priority level). In this prioritization scheme, the cellular transmissions are from the relay UE to the eNodeB (i.e., the relay UE's own cellular transmissions), the UE-to-NW relay transmissions are the remote UE's data that is transmitted by the relay UE to the eNodeB in uplink (i.e., the relayed data), the direct transmissions are sidelink (or D2D) transmissions to the relay UE or other UEs, and the discovery transmissions are transmitted to the relay UE or to other UEs.

For relay and remote UE receptions, the prioritization scheme can be defined as follows: cellular receptions can be assigned a first priority level (a highest priority), UE-to-NW relay receptions can be assigned a second priority level, direct receptions can be assigned a third priority level, and discovery receptions can be assigned a fourth priority level (a lowest priority level). In this prioritization scheme, the cellular receptions are from the eNodeB to the relay UE (i.e., the relay UE's own cellular receptions), the UE-to-NW relay receptions are the remote UE's data that is received by the relay UE from the eNodeB in downlink (i.e., the relayed data), the direct transmissions are sidelink (or D2D) receptions from the relay UE or other UEs, and the discovery receptions are received from the relay UE or from other UEs.

In one example, the prioritization schemes do not preclude the resource alignment and concurrency handling mechanisms, as described above, and are used only if the concurrency between communications at the relay UE is not properly resolved. In addition, the prioritization rules aim to manage the behavior of the UE-to-NW Relay and direct traffic, or the UE-to-NW Relay and cellular traffic.

In one example, the prioritization rules can be configured by the eNodeB or can be predefined in a specification. In one example, the prioritization rules can be applied even if the UE-to-NW relaying operates in dedicated resource pools. Moreover, the prioritization rules can be applicable across all carriers.

In one configuration, alternative prioritization rules for transmission can be considered. For example, for relay and remote UE transmissions, one of the following prioritization schemes can be implemented: (1) Cellular Transmission>UE-to-NW Relay Transmission>Direct Transmission>Discovery Transmission; (2) UE-to-NW Relay Transmission>Cellular Transmission>Direct Transmission>Discovery Transmission; (3) UE-to-NW Relay Transmission>Direct Transmission>Cellular Transmission>Discovery Transmission; (4) UE-to-NW Relay Transmission>Direct Transmission>Discovery Transmission>Cellular Transmission; (5) Cellular Transmission>Direct Transmission>UE-to-NW Relay Transmission>Discovery Transmission; (6) Cellular Transmission>Direct Transmission>Discovery Transmission>UE-to-NW Relay Transmission; (7) Cellular Transmission>UE-to-NW Relay Transmission>Discovery Transmission>Direct Transmission; (8) Direct Transmission>Cellular Transmission>UE-to-NW Relay Transmission>Discovery Transmission; or (9) Direct Transmission>UE-to-NW Relay Transmission>Cellular Transmission>Discovery Transmission.

In one configuration, alternative prioritization rules for reception can be considered. For example, for relay and remote UE reception, one of the following prioritization schemes can be implemented: (1) Cellular Reception>UE-to-NW Relay Reception>Direct Reception>Discovery Reception; (2) UE-to-NW Relay Reception>Cellular Reception>Direct Reception>Discovery Reception; (3) UE-to-NW Relay Reception>Direct Reception>Cellular Reception>Discovery Reception; (4) UE-to-NW Relay Reception>Direct Reception>Discovery Reception>Cellular Reception; (5) Cellular Reception>Direct Reception>UE-to-NW Relay Reception>Discovery Reception; (6) Cellular Reception>Direct Reception>Discovery Reception>UE-to-NW Relay Reception; (7) Cellular Reception>UE-to-NW Relay Reception>Discovery Reception>Direct Transmission; (8) Direct Reception>Cellular Reception>UE-to-NW Relay Reception>Discovery Reception; or (9) Direct Reception>UE-to-NW Relay Reception>Cellular Reception>Discovery Reception.

In one configuration, UE-to-Network relaying with concurrent free operation can be enabled at a relay UE and/or a remote UE. More specifically, an eNodeB can provide control signaling to resolve three types of concurrency at the relay UE. A first type of concurrency (Type A) at the relay UE can involve a sidelink (or D2D) transmission (Process 1) that conflicts with a cellular transmission (Process 3). A second type of concurrency (Type B) at the relay UE can involve a sidelink (or D2D) reception (Process 2) that conflicts with a cellular transmission (Process 3). A third type of concurrency (Type C) at the relay UE can involve a sidelink (or D2D) transmission (Process 1) that conflicts with a sidelink (or D2D) reception (Process 2). In one example, the concurrent free operation can be enabled at the relay UE via control signaling from the eNodeB, wherein the control signaling can function to control resources for cellular transmissions, sidelink (or D2D) transmissions and sidelink (or D2D) receptions at the relay UE.

In one example, the eNodeB can manage transmission parameters for the relay UE and the remote UE. For example, the eNodeB can provide the control signaling which indicates the transmission parameters for the relay UE and the remote UE, wherein the transmission parameters include a time resource pattern for transmission, control resources, a modulation and coding scheme (MCS) index, resource allocation, hopping parameters, and resource pools used by the remote and relay UEs.

In one example, the eNodeB can send two downlink control information (DCI) grants—a first DCI grant to the remote UE and a second DCI grant to the relay UE—in order to indicate communication resources for each UE. In another example, the eNodeB can send two sidelink DCI grants to the relay UE, in which one of the sidelink DCI grants is dedicated to the remote UE. The sidelink DCI grant that is dedicated to the remote UE can be forwarded by the remote UE using physical layer signaling over a physical shared control channel (PSCCH) or via higher layer signaling over a physical sidelink shared channel (PSSCH). For example, the sidelink DCI grant can be forwarded using medium access control (MAC)-layer signaling, radio resource control (RRC)-layer signaling, or a PC5 signaling protocol.

In one configuration, the remote UE can exhibit a first behavior or a second behavior. In the first behavior, after reception of sidelink control information from the relay UE, the remote UE can directly respond with a D2D data transmission in an associated PSSCH resource pool. The remote UE can receive transmission parameters in a Mode-1 PSCCH pool, but can retransmit control information in Mode-2 PSCCH and PSSCH pools, or transmit only PSSCH in an associated communication pool (e.g., a Mode-1 pool). In the second behavior, upon reception of sidelink control information from the relay UE, the remote UE can interpret the reception of the sidelink control information as an instruction to start using the indicated resources starting in a next sidelink transmission in PSSCH/PSCCH resource pools, unless a further instruction from the relay UE overwrites the previous transmission settings of the remote UE.

In one configuration, the relay UE can distinguish a DCI grant for the remote UE using a configured D2D RNTI, a resource association mechanism, a scrambled DCI grant payload or DMRS sequence generation, or an interpretation of SCI-Format 0 fields.

In one configuration, the eNodeB can configure two sidelink resource pools—a first sidelink resource pool for relay UE transmissions and a second sidelink resource pool for remote UE transmissions. In addition, the eNodeB can configure two sets of time transmission patterns for data and control transmissions per resource pool—a first time transmission pattern for use by the relay UE and a second time transmission pattern for use by the remote UE.

In one example, concurrent-free operations can be controlled by the relay UE that manages the transmission resources of the remote UE.

In one example, control signaling communicated from the eNodeB can indicate transmission parameters of the remote UE. The transmission parameters can include a time resource pattern for transmission, a control resource, a MCS index, a resource allocation, hopping parameters, and resource pools used by the remote and relay UEs.

In one configuration, different types of transmissions can be prioritized for the relay UE, wherein the different types of transmissions include cellular transmissions, UE-to-NW relay transmissions, direct communications and discovery communications. In one example, prioritization rules for transmission and reception can be configured by the eNodeB, or the prioritization rules can be predefined in the 3GPP specification. In another example, cellular transmissions can be prioritized over relay transmissions, and the relay transmissions can be prioritized over direct transmissions and discovery communications. In yet another example, cellular receptions can be prioritized over relay receptions, and the relay receptions can be prioritized over direct receptions and discovery communications.

Figure 5:
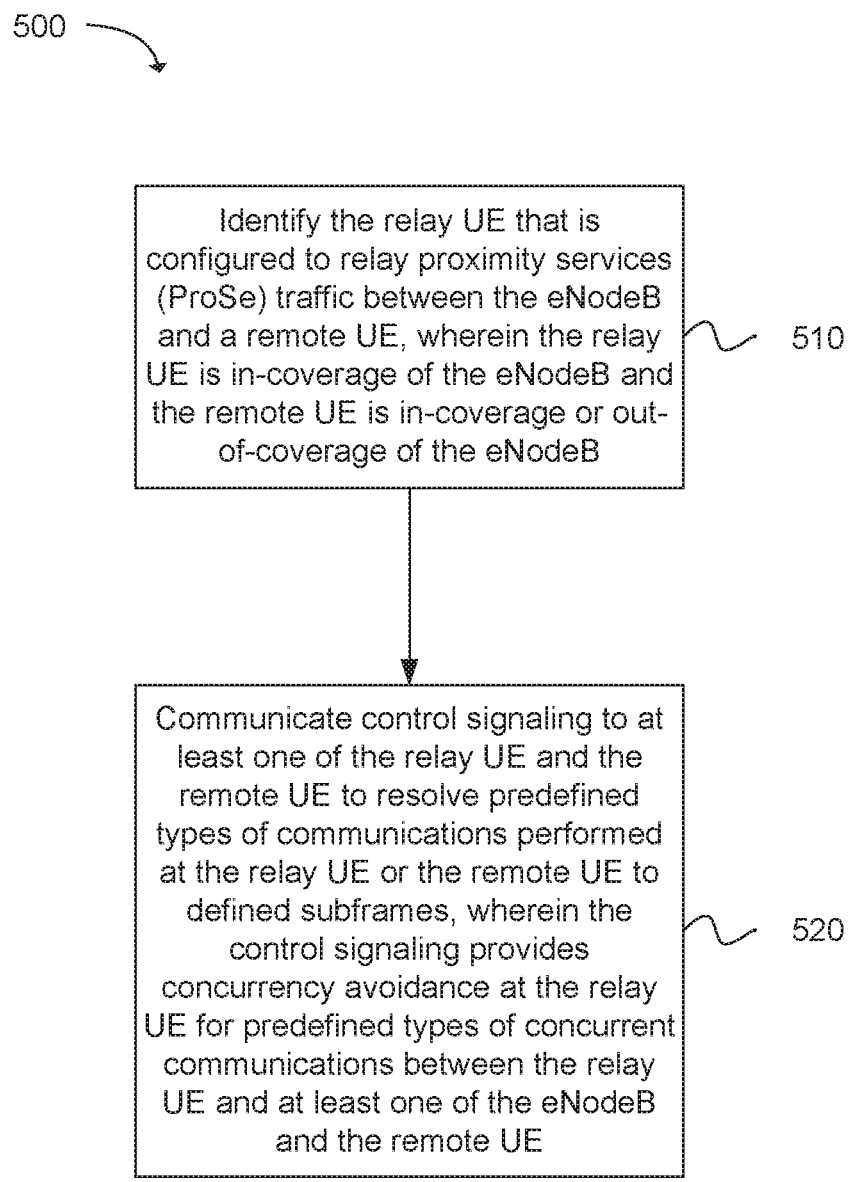
FIG. 5 depicts functionality of an eNodeB operable to resolve predefined types of concurrent communications at a relay user equipment (UE) in accordance with an example.

Another example provides functionality 500 of an eNodeB operable to resolve predefined types of concurrent communications at a relay user equipment (UE), as shown in the flow chart in FIG. 5. The functionality can be implemented as a method or the functionality can be executed as instructions on a machine, where the instructions are included on at least one computer readable medium or one non-transitory machine readable storage medium. The eNodeB can comprise one or more processors and memory configured to: identify the relay UE that is configured to relay proximity services (ProSe) traffic between the eNodeB and a remote UE, wherein the relay UE is in-coverage of the eNodeB and the remote UE is in-coverage or out-of-coverage of the eNodeB, as in block 510. The eNodeB can comprise one or more processors and memory configured to: communicate control signaling to at least one of the relay UE and the remote UE to resolve predefined types of communications performed at the relay UE or the remote UE to defined subframes, wherein the control signaling provides concurrency avoidance at the relay UE for predefined types of concurrent communications between the relay UE and at least one of the eNodeB and the remote UE, as in block 520.

Figure 6:
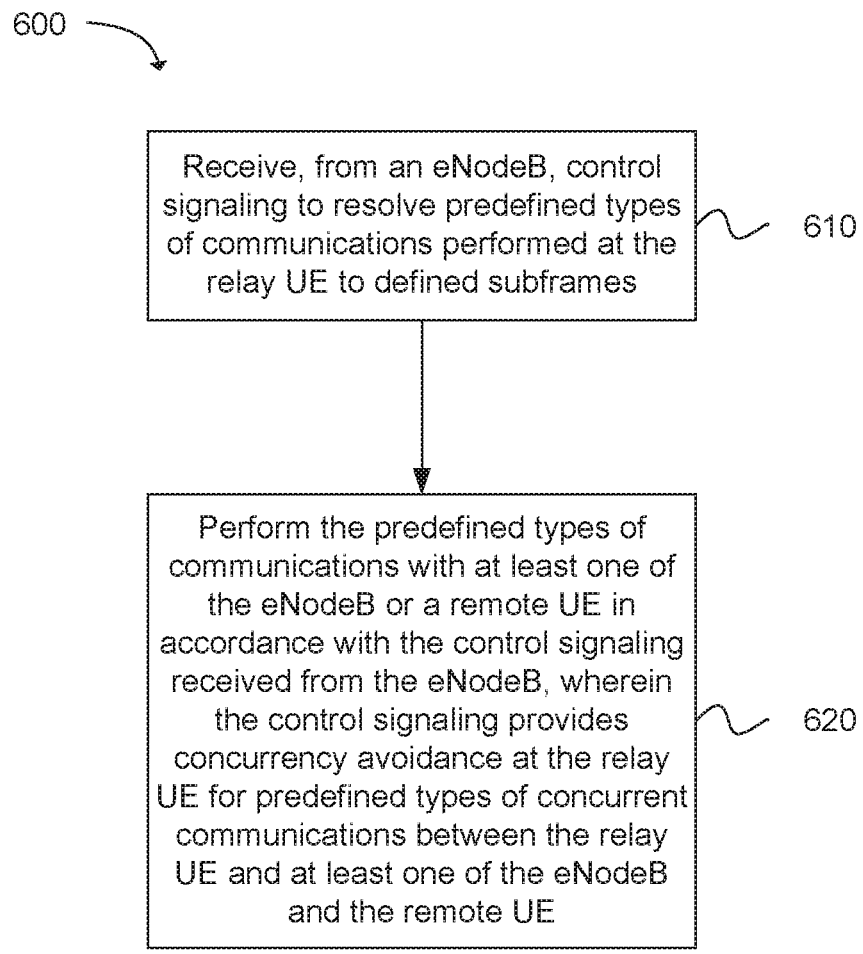
FIG. 6 depicts functionality of a relay user equipment (UE) operable to resolve predefined types of concurrent communications at the relay UE in accordance with an example.

Another example provides functionality 600 of a relay user equipment (UE) operable resolve predefined types of concurrent communications at the relay UE, as shown in the flow chart in FIG. 6. The functionality can be implemented as a method or the functionality can be executed as instructions on a machine, where the instructions are included on at least one computer readable medium or one non-transitory machine readable storage medium. The relay UE can comprise one or more processors and memory configured to: receive, from an eNodeB, control signaling to resolve predefined types of communications performed at the relay UE to defined subframes, as in block 510. The relay UE can comprise one or more processors and memory configured to: perform the predefined types of communications with at least one of the eNodeB or a remote UE in accordance with the control signaling received from the eNodeB, wherein the control signaling provides concurrency avoidance at the relay UE for predefined types of concurrent communications between the relay UE and at least one of the eNodeB and the remote UE, as in block 520.

Figure 7:
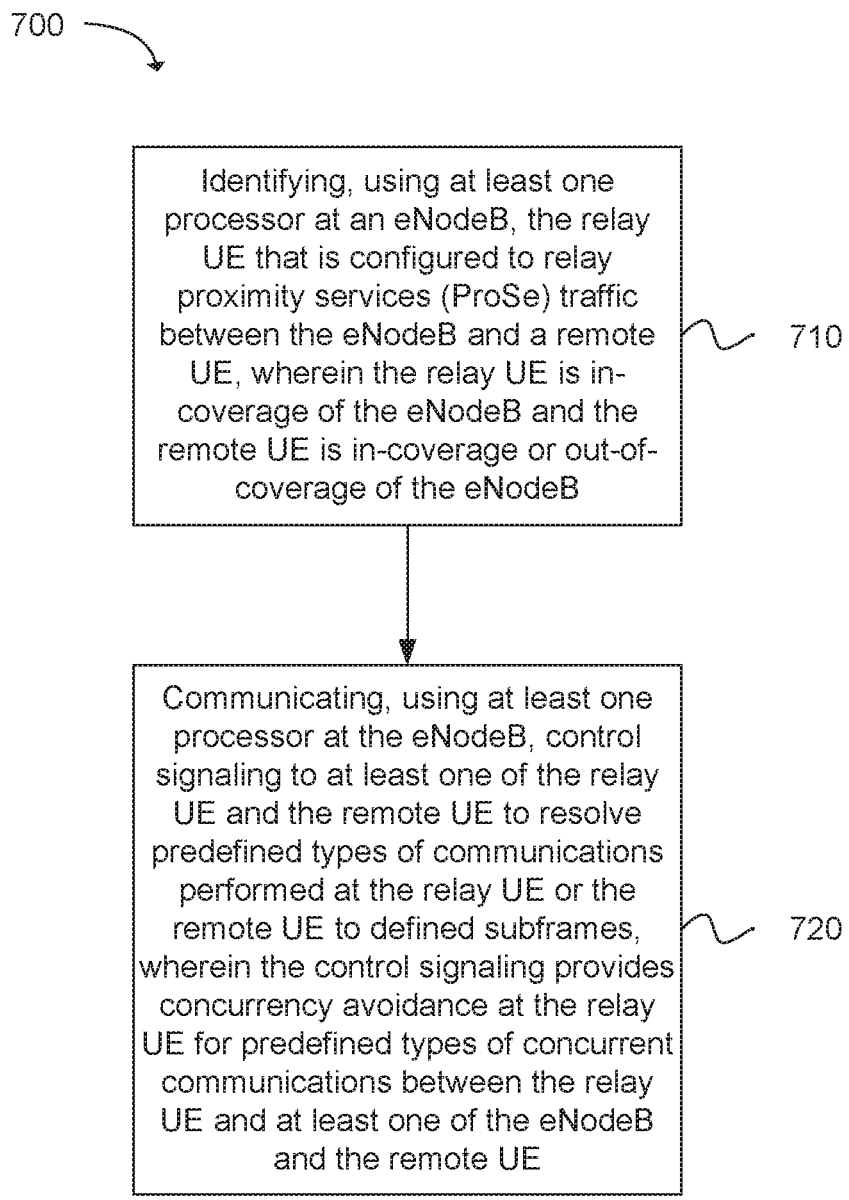
FIG. 7 depicts a flowchart of a machine readable storage medium having instructions embodied thereon for resolving predefined types of concurrent communications for a relay user equipment (UE) in accordance with an example.

Another example provides at least one machine readable storage medium having instructions 700 embodied thereon for resolving predefined types of concurrent communications for a relay user equipment (UE), as shown in the flow chart in FIG. 7. The instructions can be executed on a machine, where the instructions are included on at least one computer readable medium or one non-transitory machine readable storage medium. The instructions when executed perform: identifying, using at least one processor at an eNodeB, the relay UE that is configured to relay proximity services (ProSe) traffic between the eNodeB and a remote UE, wherein the relay UE is in-coverage of the eNodeB and the remote UE is in-coverage or out-of-coverage of the eNodeB, as in block 710. The instructions when executed perform: communicating, using at least one processor at the eNodeB, control signaling to at least one of the relay UE and the remote UE to resolve predefined types of communications performed at the relay UE or the remote UE to defined subframes, wherein the control signaling provides concurrency avoidance at the relay UE for predefined types of concurrent communications between the relay UE and at least one of the eNodeB and the remote UE, as in block 720.

Figure 8:
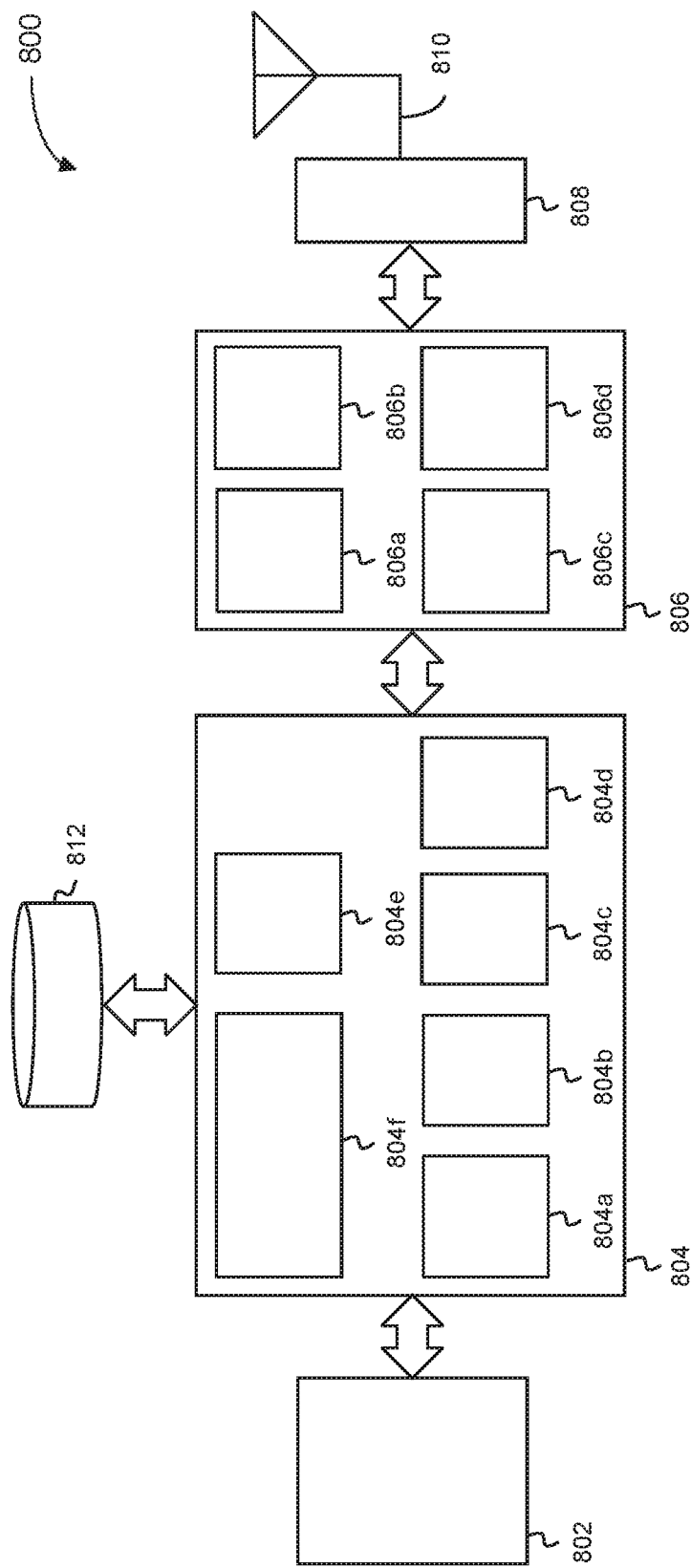
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812, and may be configured to execute instructions stored in the storage medium 812 to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804*a*, third generation (3G) baseband processor 804*b*, fourth generation (4G) baseband processor 804*c*, and/or other baseband processor(s) 804*d* for other existing generations, generations in development or to be developed in the future (e.g., fifth generation (5G), 6G etc.). The baseband circuitry 804 (e.g., one or more of baseband processors 804*a-d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804*e* of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806*a*, amplifier circuitry 806*b* and filter circuitry 806*c*. The transmit signal path of the RF circuitry 806 may include filter circuitry 806*c* and mixer circuitry 806*a*. RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by synthesizer circuitry 806*d*. The amplifier circuitry 806*b* may be configured to amplify the down-converted signals and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature down-conversion and/or up-conversion respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* may be arranged for direct down-conversion and/or direct up-conversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

Figure 9:
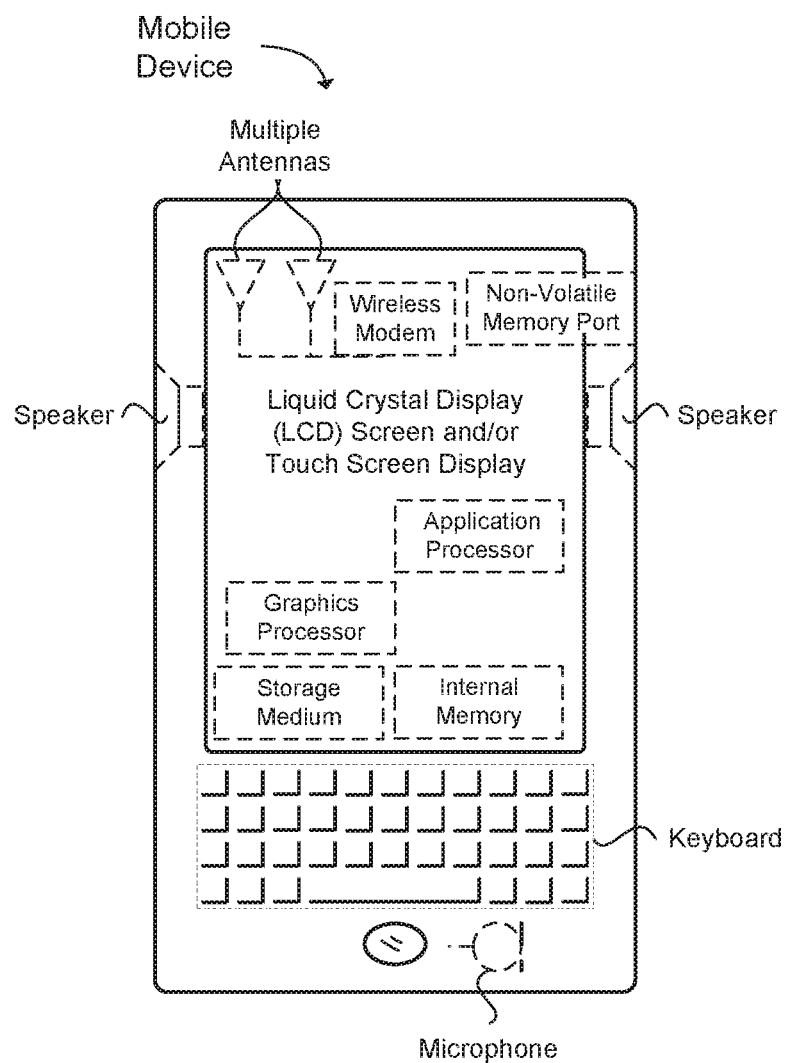
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an eNodeB operable to resolve predefined types of concurrent communications at a relay user equipment (UE), the apparatus comprising one or more processors and memory configured to: identify the relay UE that is configured to relay proximity services (ProSe) traffic between the eNodeB and a remote UE, wherein the relay UE is in-coverage of the eNodeB and the remote UE is in-coverage or out-of-coverage of the eNodeB; and communicate control signaling to at least one of the relay UE and the remote UE to resolve predefined types of communications performed at the relay UE or the remote UE to defined subframes, wherein the control signaling provides concurrency avoidance at the relay UE for predefined types of concurrent communications between the relay UE and at least one of the eNodeB and the remote UE.

Example 2 includes the apparatus of Example 1, wherein a predefined type of concurrent communication at the relay UE includes a ProSe transmission from the relay UE to the remote UE that conflicts with a cellular transmission from the relay UE to the eNodeB.

Example 3 includes the apparatus of any of Examples 1-2, wherein a predefined type of concurrent communication at the relay UE includes a ProSe reception at the relay UE from the remote UE that conflicts with a cellular transmission from the relay UE to the eNodeB.

Example 4 includes the apparatus of any of Examples 1-3, wherein a predefined type of concurrent communication at the relay UE includes a ProSe transmission from the relay UE to the remote UE that conflicts with a ProSe reception at the relay UE from the remote UE.

Example 5 includes the apparatus of any of Examples 1-4, wherein the control signaling communicated to at least one of the relay UE and the remote UE includes scheduling information that causes the relay UE to resolve predefined types of concurrent communications with at least one of the eNodeB and the remote UE.

Example 6 includes the apparatus of any of Examples 1-5, wherein the control signaling communicated to at least one of the relay UE and the remote UE indicates a defined resource pool of subframes, wherein the relay UE is configured to resolve predefined types of concurrent communications with at least one of the eNodeB and the remote UE when utilizing subframes in the defined resource pool to perform one or more predefined types of communication.

Example 7 includes the apparatus of any of Examples 1-6, wherein the control signaling communicated to at least one of the relay UE and the remote UE indicates a subset of Time Resource Patterns (T-RPTs), wherein the relay UE is configured to resolve predefined types of concurrent communications with at least one of the eNodeB and the remote UE when utilizing the subset of T-RPTs to perform one or more predefined types of communication.

Example 8 includes the apparatus of any of Examples 1-7, wherein the control signaling communicated to at least one of the relay UE and the remote UE is a ProSe grant of ProSe communication resources that provides concurrency avoidance at the relay UE for predefined types of concurrent communications.

Example 9 includes the apparatus of any of Examples 1-8, wherein the control signaling communicated to at least one of the relay UE and the remote UE is a ProSe grant of ProSe communication resources that provides concurrency avoidance at the relay UE for predefined types of concurrent communications, wherein the ProSe grant indicates a set of communication parameters including: a physical shared control channel (PSCCH) resource, a Transmit Power Control (TPC) command, and sidelink control information (SCI) format 0 fields (SCI Format 0) that include a frequency hopping flag, a resource block assignment and hopping resource allocation, and a time resource pattern (T-RPT).

Example 10 includes the apparatus of any of Examples 1-9, wherein the control signaling communicated to at least one of the relay UE and the remote UE indicates two resource pools of subframes, wherein the relay UE is configured to resolve predefined types of concurrent communications with at least one of the eNodeB and the remote UE when utilizing subframes in the two resource pool to perform predefined types of communications.

Example 11 includes the apparatus of any of Examples 1-10, wherein the control signaling communicated to at least one of the relay UE and the remote UE indicates a first ProSe grant of ProSe communication resources for the relay UE and a second ProSe grant of ProSe communication resources for the remote UE, wherein the first and second ProSe grants cause the relay UE to resolve the predefined types of concurrent communications, wherein the relay UE is configured to distinguish the first ProSe grant from the second ProSe grant based on at least one of: a Radio Network Temporary Identifier (RNTI) associated with each of the first and second ProSe grants, predefined association rules, scrambling codes associated with the first and second ProSe grants, demodulation reference signal (DRMS) sequences associated with the first and second ProSe grants or a defined downlink control information (DCI) format.

Example 12 includes the apparatus of any of Examples 1-11, wherein the control signaling communicated to at least one of the relay UE and the remote UE indicates a set of prioritization rules that provide concurrency avoidance at the relay UE for predefined types of concurrent communications, wherein the set of prioritization rules indicate that cellular communications between the relay UE and the eNodeB are assigned a first priority level, relay ProSe traffic between the relay UE and the eNodeB is assigned a second priority level, direct ProSe communications between the relay UE and the remote UE are assigned a third priority level, and discovery communications between the relay UE and the remote UE are assigned a fourth priority level.

Example 13 includes the apparatus of any of Examples 1-12, wherein the control signaling is communicated directly from the eNodeB to the remote UE when the remote UE is in-coverage or the control signaling is communicated to the remote UE via the relay UE when the remote UE is out-of-coverage.

Example 14 includes the apparatus of any of Examples 1-13, wherein the control signaling communicated to at least one of the relay UE and the remote UE is physical layer control signaling or higher layer control signaling.

Example 15 includes the apparatus of any of Examples 1-14, wherein: the eNodeB controls ProSe communication resources in accordance with a first sidelink transmission mode; or at least one of the relay UE or the remote UE selects ProSe communication resources from a defined resource pool of subframes that is configured by the eNodeB in accordance with a second sidelink transmission mode.

Example 16 includes an apparatus of a relay user equipment (UE) operable resolve predefined types of concurrent communications at the relay UE, the apparatus comprising one or more processors and memory configured to: receive, from an eNodeB, control signaling to resolve predefined types of communications performed at the relay UE to defined subframes; and perform the predefined types of communications with at least one of the eNodeB or a remote UE in accordance with the control signaling received from the eNodeB, wherein the control signaling provides concurrency avoidance at the relay UE for predefined types of concurrent communications between the relay UE and at least one of the eNodeB and the remote UE.

Example 17 includes the apparatus of Example 16, wherein a predefined type of concurrent communication at the relay UE includes: a proximity services (ProSe) transmission from the relay UE to the remote UE that conflicts with a cellular transmission from the relay UE to the eNodeB; or a ProSe reception at the relay UE from the remote UE that conflicts with a cellular transmission from the relay UE to the eNodeB; or a ProSe transmission from the relay UE to the remote UE that conflicts with a ProSe reception at the relay UE from the remote UE.

Example 18 includes the apparatus of any of Examples 16-17, further configured to: communicate, from the relay UE to a remote UE, sidelink control information that includes a set of parameters over a Physical Sidelink Control Channel (PSCCH) or a Physical Sidelink Shared Channel (PSSCH), wherein the set of parameters indicate Physical Sidelink Control Channel (PSCCH) resources (nPSCCH), time resource patterns (ITRP), and a modulation and coding scheme (IMCS), wherein: the set of parameters enable the remote UE to perform ProSe communications with the relay UE using a defined PSSCH resource pool; or the set of parameters enable the remote UE to utilize a defined PSSCH resource pool when performing a subsequent ProSe communication with the relay UE.

Example 19 includes the apparatus of any of Examples 16-18, wherein the relay UE is in-coverage of the eNodeB and the remote UE is in-coverage or out-of-coverage of the eNodeB.

Example 20 includes the apparatus of any of Examples 16-19, wherein the relay UE includes at least one of an antenna, a touch sensitive display screen, a speaker, a microphone, a graphics processor, an application processor, a baseband processor, an internal memory, a non-volatile memory port, and combinations thereof.

Example 21 includes at least one non-transitory machine readable storage medium having instructions embodied thereon for resolving predefined types of concurrent communications for a relay user equipment (UE), the instructions when executed perform the following: identifying, using at least one processor at an eNodeB, the relay UE that is configured to relay proximity services (ProSe) traffic between the eNodeB and a remote UE, wherein the relay UE is in-coverage of the eNodeB and the remote UE is in-coverage or out-of-coverage of the eNodeB; and communicating, using at least one processor at the eNodeB, control signaling to at least one of the relay UE and the remote UE to resolve predefined types of communications performed at the relay UE or the remote UE to defined subframes, wherein the control signaling provides concurrency avoidance at the relay UE for predefined types of concurrent communications between the relay UE and at least one of the eNodeB and the remote UE.

Example 22 includes the at least one non-transitory machine readable storage medium of Example 21, wherein a predefined type of concurrent communication at the relay UE includes: a ProSe transmission from the relay UE to the remote UE that conflicts with a cellular transmission from the relay UE to the eNodeB; or a ProSe reception at the relay UE from the remote UE that conflicts with a cellular transmission from the relay UE to the eNodeB; or a ProSe transmission from the relay UE to the remote UE that conflicts with a ProSe reception at the relay UE from the remote UE.

Example 23 includes the at least one non-transitory machine readable storage medium of any of Examples 21-22, wherein the control signaling communicated to at least one of the relay UE and the remote UE includes: scheduling information that causes the relay UE to resolve predefined types of concurrent communications with at least one of the eNodeB and the remote UE; or a defined resource pool of subframes, wherein the relay UE is configured to resolve predefined types of concurrent communications with at least one of the eNodeB and the remote UE when utilizing subframes in the defined resource pool to perform one or more predefined types of communication; or a subset of Time Resource Patterns (T-RPTs), wherein the relay UE is configured to resolve predefined types of concurrent communications with at least one of the eNodeB and the remote UE when utilizing the subset of T-RPTs to perform one or more predefined types of communication.

Example 24 includes the at least one non-transitory machine readable storage medium of any of Examples 21-23, wherein the control signaling communicated to at least one of the relay UE and the remote UE is a ProSe grant of ProSe communication resources that provides concurrency avoidance at the relay UE for predefined types of concurrent communications, wherein the ProSe grant indicates a set of communication parameters including: a physical shared control channel (PSCCH) resource, a Transmit Power Control (TPC) command, and sidelink control information (SCI) format 0 fields (SCI Format 0) that include a frequency hopping flag, a resource block assignment and hopping resource allocation, and a time resource pattern (T-RPT).

Example 25 includes the at least one non-transitory machine readable storage medium of any of Examples 21-24, wherein the control signaling communicated to at least one of the relay UE and the remote UE indicates a set of prioritization rules that provide concurrency avoidance at the relay UE for predefined types of concurrent communications, wherein the set of prioritization rules indicate that cellular communications between the relay UE and the eNodeB are assigned a first priority level, relay ProSe traffic between the relay UE and the eNodeB is assigned a second priority level, direct ProSe communications between the relay UE and the remote UE are assigned a third priority level, and discovery communications between the relay UE and the remote UE are assigned a fourth priority level.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to resolve predefined types of concurrent communications at a relay user equipment (UE), the apparatus comprising one or more processors and memory configured to:
   identify the relay UE that is configured to relay proximity services (ProSe) traffic between the eNodeB and a remote UE, wherein the relay UE is in-coverage of the eNodeB and the remote UE is in-coverage or out-of-coverage of the eNodeB; and
   communicate control signaling to at least one of the relay UE and the remote UE to resolve predefined types of communications performed at the relay UE or the remote UE to defined subframes, wherein the control signaling provides concurrency avoidance at the relay UE for predefined types of concurrent communications between the relay UE and at least one of the eNodeB and the remote UE;
   wherein the control signaling communicated to at least one of the relay UE and the remote UE is a ProSe grant of ProSe communication resources that provides concurrency avoidance at the relay UE for predefined types of concurrent communications.

2. The apparatus of claim 1, wherein a predefined type of concurrent communication at the relay UE includes a ProSe transmission from the relay UE to the remote UE that conflicts with a cellular transmission from the relay UE to the eNodeB.

3. The apparatus of claim 1, wherein a predefined type of concurrent communication at the relay UE includes a ProSe reception at the relay UE from the remote UE that conflicts with a cellular transmission from the relay UE to the eNodeB.

4. The apparatus of claim 1, wherein a predefined type of concurrent communication at the relay UE includes a ProSe transmission from the relay UE to the remote UE that conflicts with a ProSe reception at the relay UE from the remote UE.

5. The apparatus of claim 1, wherein the control signaling communicated to at least one of the relay UE and the remote UE includes scheduling information that causes the relay UE to resolve predefined types of concurrent communications with at least one of the eNodeB and the remote UE.

6. The apparatus of claim 1, wherein the control signaling communicated to at least one of the relay UE and the remote UE indicates a defined resource pool of subframes, wherein the relay UE is configured to resolve predefined types of concurrent communications with at least one of the eNodeB and the remote UE when utilizing subframes in the defined resource pool to perform one or more predefined types of communication.

7. The apparatus of claim 1, wherein the control signaling communicated to at least one of the relay UE and the remote UE indicates a subset of Time Resource Patterns (T-RPTs), wherein the relay UE is configured to resolve predefined types of concurrent communications with at least one of the eNodeB and the remote UE when utilizing the subset of T-RPTs to perform one or more predefined types of communication.

8. The apparatus of claim 1, wherein the control signaling communicated to at least one of the relay UE and the remote UE is a ProSe grant of ProSe communication resources that provides concurrency avoidance at the relay UE for predefined types of concurrent communications, wherein the ProSe grant indicates a set of communication parameters including: a physical shared control channel (PSCCH) resource, a Transmit Power Control (TPC) command, and sidelink control information (SCI) format 0 fields (SCI Format 0) that include a frequency hopping flag, a resource block assignment and hopping resource allocation, and a time resource pattern (T-RPT).

9. The apparatus of claim 1, wherein the control signaling communicated to at least one of the relay UE and the remote UE indicates two resource pools of subframes, wherein the relay UE is configured to resolve predefined types of concurrent communications with at least one of the eNodeB and the remote UE when utilizing subframes in the two resource pool to perform predefined types of communications.

10. The apparatus of claim 1, wherein the control signaling communicated to at least one of the relay UE and the remote UE indicates a first ProSe grant of ProSe communication resources for the relay UE and a second ProSe grant of ProSe communication resources for the remote UE, wherein the first and second ProSe grants cause the relay UE to resolve the predefined types of concurrent communications, wherein the relay UE is configured to distinguish the first ProSe grant from the second ProSe grant based on at least one of: a Radio Network Temporary Identifier (RNTI) associated with each of the first and second ProSe grants, predefined association rules, scrambling codes associated with the first and second ProSe grants, demodulation reference signal (DRMS) sequences associated with the first and second ProSe grants or a defined downlink control information (DCI) format.

11. The apparatus of claim 1, wherein the control signaling communicated to at least one of the relay UE and the remote UE indicates a set of prioritization rules that provide concurrency avoidance at the relay UE for predefined types of concurrent communications, wherein the set of prioritization rules indicate that cellular communications between the relay UE and the eNodeB are assigned a first priority level, relay ProSe traffic between the relay UE and the eNodeB is assigned a second priority level, direct ProSe communications between the relay UE and the remote UE are assigned a third priority level, and discovery communications between the relay UE and the remote UE are assigned a fourth priority level.

12. The apparatus of claim 1, wherein the control signaling is communicated directly from the eNodeB to the remote UE when the remote UE is in-coverage or the control signaling is communicated to the remote UE via the relay UE when the remote UE is out-of-coverage.

13. The apparatus of claim 1, wherein the control signaling communicated to at least one of the relay UE and the remote UE is physical layer control signaling or higher layer control signaling.

14. The apparatus of claim 1, wherein:
the eNodeB controls ProSe communication resources in accordance with a first sidelink transmission mode; or
at least one of the relay UE or the remote UE selects ProSe communication resources from a defined resource pool of subframes that is configured by the eNodeB in accordance with a second sidelink transmission mode.

15. An apparatus of a relay user equipment (UE) operable resolve predefined types of concurrent communications at the relay UE, the apparatus comprising one or more processors and memory configured to:
receive, from an eNodeB, control signaling to resolve predefined types of communications performed at the relay UE to defined subframes;
perform the predefined types of communications with at least one of the eNodeB or a remote UE in accordance with the control signaling received from the eNodeB, wherein the control signaling provides concurrency avoidance at the relay UE for predefined types of concurrent communications between the relay UE and at least one of the eNodeB and the remote UE;
communicate, from the relay UE to a remote UE, sidelink control information that includes a set of parameters over a Physical Sidelink Control Channel (PSCCH) or a Physical Sidelink Shared Channel (PSSCH), wherein the set of parameters indicate PSCCH resources ($n_{PSSCH}$), time resource patterns ($I_{TRP}$), and a modulation and coding scheme ($I_{MCS}$), wherein:
the set of parameters enable the remote UE to perform ProSe communications with the relay UE using a defined PSSCH resource pool; or
the set of parameters enable the remote UE to utilize a defined PSSCH resource pool when performing a subsequent ProSe communication with the relay UE.

16. The apparatus of claim 15, wherein a predefined type of concurrent communication at the relay UE includes:
a proximity services (Pro Se) transmission from the relay UE to the remote UE that conflicts with a cellular transmission from the relay UE to the eNodeB; or
a ProSe reception at the relay UE from the remote UE that conflicts with a cellular transmission from the relay UE to the eNodeB; or
a ProSe transmission from the relay UE to the remote UE that conflicts with a ProSe reception at the relay UE from the remote UE.

17. The apparatus of claim 15, wherein the relay UE is in-coverage of the eNodeB and the remote UE is in-coverage or out-of-coverage of the eNodeB.

18. The apparatus of claim 15, wherein the relay UE includes at least one of an antenna, a touch sensitive display screen, a speaker, a microphone, a graphics processor, an application processor, a baseband processor, an internal memory, a non-volatile memory port, and combinations thereof.

* * * * *